US011806297B2

(12) United States Patent
Wei (10) Patent No.: US 11,806,297 B2
(45) Date of Patent: Nov. 7, 2023

(54) AUTOMATIC NURSING ROBOT

(71) Applicant: HANGZHOU KELUI BAOTTE INTELLIGENT TECHNOLOGY CO. LTD., Hangzhou (CN)

(72) Inventor: Hao Wei, Hangzhou (CN)

(73) Assignee: HANGZHOU KELUI BAOTTE INTELLIGENT TECHNOLOGY CO., LTD., Hangzhou (CN)

( * ) Notice: Subject to any disclaimer, the term of this patent is extended or adjusted under 35 U.S.C. 154(b) by 258 days.

(21) Appl. No.: 17/476,491

(22) Filed: Sep. 16, 2021

(65) Prior Publication Data
US 2022/0000693 A1    Jan. 6, 2022

Related U.S. Application Data

(63) Continuation of application No. PCT/CN2019/124850, filed on Dec. 12, 2019.

(30) Foreign Application Priority Data

Nov. 23, 2019   (CN) .......................... 201911164218.X (51) Int. Cl.
*A61G 9/02* (2006.01)
*B08B 9/032* (2006.01)
(Continued)

(52) U.S. Cl.
CPC .............. *A61G 9/02* (2013.01); *B08B 9/0321* (2013.01); *B08B 9/093* (2013.01); *B25J 5/007* (2013.01);
(Continued)

(58) Field of Classification Search
CPC .......... A61G 9/02; A61G 9/00; B08B 9/0321; B08B 9/093; B08B 2209/032;
(Continued)

(56) References Cited

U.S. PATENT DOCUMENTS

2022/0000693 A1*   1/2022   Wei .......................... A61G 9/00
2023/0129932 A1*   4/2023   Wang .................. A61B 10/007
                                                                          4/321

FOREIGN PATENT DOCUMENTS

CN         101099708 A      1/2008
CN         103989563 A      8/2014
(Continued)

OTHER PUBLICATIONS

International Search Report issued in corresponding International application No. PCT/CN2019/124850, dated Aug. 24, 2020.
(Continued)

*Primary Examiner* — Lori L Baker
(74) *Attorney, Agent, or Firm* — Georgi Korobanov (57) ABSTRACT

An automated nursing robot is disclosed, including a main body unit, a wastewater bucket, a clean water bucket, a water injection and wastewater discharge unit for discharging and flushing the wastewater bucket and adding water into the clean water bucket, a mobile base disposed under the wastewater bucket and clean water bucket for carrying both to move between the main body unit and the water injection and wastewater discharge unit, and a connecting side plate arranged on one side of the mobile base. The main body unit and the water injection and wastewater discharge unit are each equipped with a positioning and fixing plate. Each positioning and fixing plate is provided with a pipe joint A, and the connecting side plate is correspondingly provided with a pipe joint B, and the pipe joint A and the pipe joint B are mutually attracted and connected by a magnetic attraction assembly.

9 Claims, 3 Drawing Sheets (51) Int. Cl.
*B08B 9/093* (2006.01)
*B25J 5/00* (2006.01)
*B25J 11/00* (2006.01)
*F16L 37/00* (2006.01)

(52) U.S. Cl.
CPC ........... *B25J 11/009* (2013.01); *F16L 37/004* (2013.01); *B08B 2209/032* (2013.01); *B08B 2209/08* (2013.01)

(58) Field of Classification Search
CPC ..... B08B 2209/08; B25J 5/007; B25J 11/009; F16L 37/004; F16L 23/00
USPC ............................................. 4/321, 300, 315
See application file for complete search history.

(56) References Cited

FOREIGN PATENT DOCUMENTS

| | | | |
|---|---|---|---|
| CN | 106123563 | A | 11/2016 |
| CN | 101708144 | A | 5/2020 |
| KR | 100942215 | B1 | 2/2010 |
| KR | 101947797 | B1 | 2/2019 |

OTHER PUBLICATIONS

Written Opinion of the International Searching Authority for No. PCT/CN2019/124850.

\* cited by examiner

AUTOMATIC NURSING ROBOT

CROSS-REFERENCE TO RELATED APPLICATIONS

This application is a U.S. continuation of co-pending International Patent Application Number PCT/CN2019/124850, filed Dec. 12, 2019, which claims the priority and benefit of Chinese patent application number 201911164218.X, entitled "Automated Nursing Robot" and filed Nov. 23, 2019, with China National Intellectual Property Administration, the entire contents of which are incorporated herein by reference.

TECHNICAL FIELD

This disclosure relates to the technical field of medical care, and more particularly relates to an automated nursing robot.

BACKGROUND

An existing excreta disposal robot typically includes a working head and an integrated main machine, where the working head is installed on the private parts of the patient, the main machine is equipped with a wastewater bucket containing waste matter and a clean water bucket for providing clean water, and the main machine and the working head are connected by pipes. During use, the main machine sucks the excreta collected by the working head into the wastewater bucket, and flushes the private parts of the patient and the inside of the working head with clean water. However, due to the limited capacity of the wastewater bucket and the clean water bucket of the nursing robot, the caregiver needs to manually take out the wastewater bucket or the clean water bucket, drain the wastewater bucket or add water to the clean water bucket, and then load it into the nursing robot on a regular basis, which increases the caregiver's burden of labor, and also may lend it prone to the situation where the replacement is not timely due to inadequate monitoring. In the related art, there is also the use of connecting the wastewater bucket and the clean water bucket directly to the sewer and the tap water source, respectively, through pipelines. Although it can reduce the burden on the caregiver, the pipeline connecting the wastewater bucket (or clean water bucket) to the sewer (or tap water source) is long so that a lot of waste matter (or clean water) may remain in the pipeline. Because the pipeline is prone to age, and once the pipeline is damaged and leaks, the indoor environment will be polluted. In addition, this wastewater discharge and water supplement method also leads to many indoor ground pipelines, which are messy and over which people are easy to trip. If the pipeline needs to pass through the door or the wall, the indoor building needs to be worked on, making the installation inconvenient. Furthermore, due to the restriction of the pipeline, the space for the nursing robot to move about is limited.

SUMMARY

It is therefore an objective of this disclosure to provide an automated nursing robot in view of the technical status quo. The nursing robot according to the present disclosure does not need long pipelines for wastewater discharge and water addition, which is more convenient and labor-saving, and effectively reduces the burden on the nursing staff.

To achieve the above objective, this disclosure adopts the following technical solutions.

There is provided an automated nursing robot including a main body unit, a wastewater bucket, and a clean water bucket. The main body unit includes an excreta suction mechanism and a clean water flushing mechanism. The nursing robot further includes a water injection and wastewater discharge unit for discharging and cleaning the wastewater bucket and adding water into the clean water bucket. The wastewater bucket and the clean water bucket are equipped with a mobile base for carrying both to move between the main body unit and the water injection and wastewater discharge unit. One side of the mobile base is provided with a connecting side plate. The main body unit and the water injection and wastewater discharge unit are each provided with a positioning and fixing plate for connecting with the connecting side plate, and each positioning and fixing plate is provided with a pipe joint A for connecting with the wastewater bucket or the clean water bucket, and the connecting side plate is correspondingly provided with a pipe joint B, and the pipe joint A and the pipe joint B are mutually attracted and connected by a magnetic attraction assembly.

In some embodiments, the magnetic attraction assembly includes an electromagnetic coil and a magnetic metal sealing disc matching the electromagnetic coil, where the magnetic metal sealing disc is sleeved on either of the pipe joint A or the pipe joint B, and the electromagnetic coil is sleeved on either of the pipe joint A or the pipe joint B whichever is not installed with the magnetic metal sealing disc.

In some embodiments, the connecting side plate is fixed with a locking member for locking the connecting side plate and the positioning and fixing plate to each other.

In some embodiments, the positioning and fixing plate includes a threaded locking hole, and the locking member includes a locking screw that goes through and is screwed to the locking hole and a locking motor for driving the locking screw for locking/unscrewing.

In some embodiments, the wastewater bucket includes a bucket body and a bucket cover. The lower part of the bucket body is provided with a wastewater outlet for discharging wastewater. The bucket cover is horizontally provided with a first port for pumping air or injecting cleaning water and a second port for sucking in wastewater or discharging cleaning water. The pipe joint B includes a wastewater joint for connecting to the wastewater outlet, an air suction and water injection joint for connecting with the first port, and a wastewater suction and drainage joint for connecting with the second port. The pipe joint B further includes a clean water inlet and outlet joint used to lead the clean water into or out of the clean water bucket.

In some embodiments, the positioning and fixing plate includes a first positioning and fixing plate installed on the water injection and wastewater discharge unit. The pipe joint A fixed on the first positioning and fixing plate includes a flushing water injection joint for connecting with the air suction and water injection joint, a flushing water outlet joint for connecting with the wastewater suction and drainage joint, and a clean water injection joint for connecting with the clean water inlet and outlet joints. The water injection and wastewater discharge unit includes a water supply pipe for connecting to a water source, where one end of the water supply pipe away from the water source is sequentially connected to a water pump for pumping water and a control valve for controlling the direction of water flow. The control valve connected to each of the flushing water injection joint and the clean water injection joint through a branch pipeline.

In some embodiments, the pipe joint A fixed on the first positioning and fixing plate further includes a wastewater drainage joint for connecting with the wastewater removal joint. The water injection and wastewater discharge unit further includes a wastewater pipe for connecting to the sewer. One end of the wastewater pipe away from the sewer is connected to a wastewater pump for pumping wastewater from the wastewater bucket to the sewer, and the wastewater pump is connected with the wastewater removal joint.

In some embodiments, the excreta suction mechanism includes a negative pressure source for extracting the air in the wastewater bucket. The positioning and fixing plate further includes a second positioning and fixing plate installed on the main body unit. The pipe joint A fixed on the second positioning fixing plate includes a air suction joint for connecting the negative pressure source with the air suction and water injection joint and a wastewater injection joint for connecting with the wastewater suction and drainage joint. The end of the wastewater injection joint away from the wastewater suction and drainage joint is connected to the working head.

In some embodiments, the pipe joint A fixed on the second positioning and fixing plate further includes a clean water output joint for connecting the clean water inlet and outlet joint with the working head. The clean water flushing mechanism includes a clean water pipe for connecting the working head to the clean water output joint. Along the conveying direction of the clean water pipe are sequentially connected a heating and sterilization assembly for heating and sterilizing the clean water output from the clean water bucket and a hot water pump for pumping the heated and sterilized water to the working head.

In some embodiments, the mobile base is connected with a wheel, and a moving motor for driving wheel to rotate is arranged on a side of the wheel.

This disclosure may have the following beneficial effects.

This disclosure does not require manually wastewater dumping, wastewater bucket cleaning or clean water injection, thus effectively reducing the labor burden on the nursing staff. Furthermore, because the main body unit, the water injection and wastewater discharge unit, the wastewater bucket, and the clean water bucket adopt a separate design, combined with the pipe connecting function of the magnetic attraction assembly, there is no need to use a long pipeline for transportation back and forth from the water injection and wastewater discharge unit to the slot bucket and clean water bucket, which effectively solve the technical problems in the related art, such as many indoor ground pipelines caused by long pipeline transportation, easily tripping people over, the need to work on indoor buildings, and limited space for the nursing robot. From the connection and separation between both of the wastewater bucket and clean water bucket and the main body unit, to the connection and separation between the two and the water injection and wastewater discharge unit, manual operation and monitoring are not required, so that long-term operations can be carried out without needing supervision.

DETAILED DESCRIPTION OF ILLUSTRATIVE EMBODIMENTS

The present disclosure will be described in further detail below in conjunction with the drawings and embodiments.

Referring to FIGS. 1 to 7, the present disclosure discloses an automatic nursing robot, including a main body unit 2, a working head, a wastewater bucket 3, and a clean water bucket 4. The working head is installed on the private parts of the patient, and can use the products currently available on the market. The main body unit 2 includes an excreta suction mechanism 21 and a clean water flushing mechanism 22. The excrement suction mechanism 21 is used to suck up the excreta of the patient into the wastewater bucket 3. The clean water flushing mechanism 22 is used to deliver the clean water in the clean water bucket 4 to the working head to clean the inner cavity of the working head carrying waste matter or to clean the private parts of the patient. The nursing robot further includes a water injection and wastewater discharge unit 7 for flushing the wastewater bucket 3 and filling the clean water bucket 4 with water. The water injection and wastewater discharge unit 7 is disposed near a sewer entrance and water source port to facilitate the procurement of water sources and the discharge of wastewater. Under the wastewater bucket 3 and the clean water bucket 4 is disposed a mobile base 5 for carrying both to move between the main body unit 2 and the water injection and wastewater discharge unit 7. One side of the mobile base 5 is provided with a connecting side plate 61 for connecting with the main body unit 2 or the water injection and wastewater discharge unit 7. The main body unit 2 and the water injection and wastewater discharge unit 7 are each provided with a positioning and fixing plate 62 for connecting to the connecting side plate 61. Each positioning and fixing plate 62 is provided with a pipe joint A for connecting with the wastewater bucket 3 or the clean water bucket 4. The connecting side plate 61 is correspondingly provided with a pipe joint B, and the pipe joint A and the pipe joint B are connected to each other by the magnetic attraction assembly 8.

During operation, the wastewater bucket 3 and the clean water bucket 4 can communicate with the main body unit 2 through the pipe joint A and the pipe joint B. The pipe joints A and B are mutually attracted and connected by the magnetic attraction assembly 8, without needing manual pipe connection. The waste matter is sucked into the wastewater bucket 3 under the action of the excreta suction mechanism 21, and the clean water in the clean water bucket 4 is transported to the working head through the clean water flushing mechanism 22 to clean the patient's private parts or working head. When the wastewater bucket 3 is full of wastewater or the clean water bucket 4 is short of water (in this embodiment, the wastewater bucket 3 and the clean water bucket 4 are each equipped with a liquid level sensor that detects whether the liquid level in the wastewater bucket 3 is higher than a certain liquid level or whether the liquid level in the clean water bucket 4 is lower than a certain liquid level), the pipe joint A and pipe joint B are disconnected, and the wastewater bucket 3 and the clean water bucket 4 can be transferred to the water injection and wastewater discharge unit 7 through the movable base, and then connected to the water injection and wastewater discharge unit 7 through the pipe joint A and the pipe joint B. Through the water injection and wastewater discharge unit 7, the wastewater in the wastewater bucket 3 is discharged, and thereafter the wastewater bucket 3 is cleaned, and new clean water is added to the clean water bucket 4, without needing manual wastewater disposal or clean water injection, thus effectively reducing the burden of labor on the caregiver. Furthermore, because the main body unit 2, the water injection and wastewater discharge unit 7, the wastewater bucket 3, and the clean water bucket 4 adopt a separate design, combined with the pipe connecting function of the magnetic attraction assembly, there is no need for a long pipeline for transportation back and forth from the water injection and wastewater discharge unit 7 to the wastewater bucket 3 and clean water bucket 4. Which effectively solves the technical problems in the related art, such as many indoor ground pipelines over which people can easily trip, the need to work on indoor buildings, and limited space for the nursing robot due to long pipelines for transportation. From the connection and separation between both of the wastewater bucket 3 and clean water bucket 4 and the main body unit 2, to the connection and separation between the two and the water injection and wastewater discharge unit 7, there is no need for manual operation and monitoring, so that long-term operations can be carried out without supervision.

In this embodiment, the buckets are each equipped with a highest level water level sensor for detecting the predetermined highest water level in the bucket and a lowest water level sensor for detecting the predetermined lowest water level in the bucket, where the highest and lowest water levels here can be set manually as required. When the wastewater bucket 3 and the clean water bucket 4 are connected to the main body unit 2 (i.e., when the nursing robot is in state of use), if the liquid level in the wastewater bucket 3 is higher than the predetermined level (detected by the highest limit liquid level sensor) or if the liquid level in the clean water bucket 4 is lower than the predetermined liquid level (detected by the lowest limit liquid level sensor), then the controller may control the mobile unit to move away from the main body unit. When performing wastewater treatment, the lowest limit liquid level sensor in the wastewater bucket 3 can detect whether the waste matter in the wastewater bucket 3 has been discharged. When filling water into the clean water bucket 4, the highest limit liquid level sensor in the clean water bucket 4 can detect whether the clean water bucket 4 has been filled with water.

As a specific implementation of the present disclosure, when the surrounding environment is relatively complicated, in order to facilitate the movement of the buckets of the present disclosure and the mating with the main body unit 2 and the water injection and wastewater discharge unit 7, obstacles can be detected by an obstacle detector during the movement to avoid obstacles and assist the mobile base 5 to move safely and smoothly to the water injection and wastewater discharge unit 7. In this embodiment, the obstacle is avoided by using an ultrasonic sensor. When the ultrasonic waves emitted by the ultrasonic sensor detect an obstacle, the ultrasonic sensor receives the ultrasonic signal reflected by the obstacle, and after processing and calculation, the relevant information or parameters such as the distance between the obstacle and the mobile base 5 is obtained, and then the controller controls the mobile base 5 to perform evasive actions to change the path depending on the signal of the ultrasonic sensor. When the mobile base 5 moves to the vicinity of the water injection and wastewater discharge unit 7, an image recognition sensor can be used to assist the mating between the two. The image recognition sensor collects and recognizes the shape and position of the positioning and fixing plate 62, and the controller controls the mobile base 5 to move according to the signal of the image recognition sensor, so that the connecting side plate 61 and the positioning and fixing plate 62 can be joined more quickly and smoothly.

Figure 2:
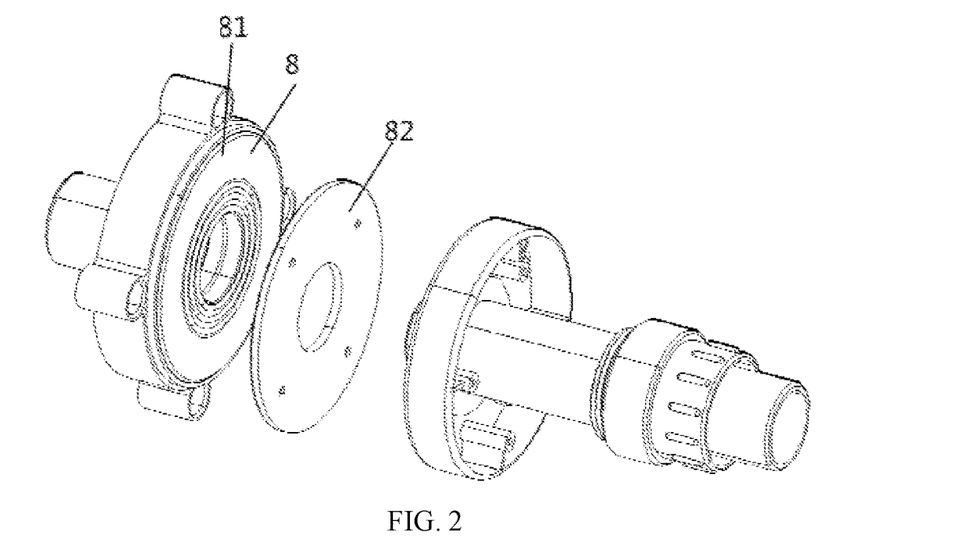
FIG. 2 is a schematic diagram illustrating the structure of the magnetic attraction assembly.

Referring to FIG. 2, the magnetic attraction assembly 8 includes an electromagnetic coil 81 and a magnetic metal sealing disk 82 that works in cooperation with the electromagnetic coil 81. The magnetic metal sealing disk 82 may be a sealing disk made of iron, cobalt, nickel, and alloys thereof, that can be attracted by magnetic substances. In this embodiment, the magnetic metal sealing disc 82 may be an iron sealing disc, which is sleeved on either the pipe joint A or the pipe joint B, and the electromagnetic coil 81 is sleeved on the pipe joint A or the pipe joint B on whichever the magnetic metal sealing disc 82 is not installed.

The present disclosure realizes the mutual connection between the pipe joint A and the pipe joint B through the magnetic attraction assembly 8. As a specific implementation of the present disclosure, the magnetic metal sealing disc 82 is sleeved on the pipe joint B, and the electromagnetic coil 81 is sleeved on the pipe joint A. As another specific implementation of the present disclosure, the magnetic metal sealing disk 82 is sleeved on the pipe joint A, and the electromagnetic coil 81 is sleeved on the pipe joint B. In this embodiment, the electromagnetic coil 81 is sleeved on the pipe joint A, and the magnetic metal sealing disc 82 is sleeved on the pipe joint B. During use, the coil of the electromagnetic coil 81 is energized to generate an electromagnetic force, which is attracted with the magnetic metal sealing disc 82, thus achieving the interconnection between the pipe joint A and the pipe joint B. Conversely, when the pipe joint A and the pipe joint B need to be separated, the coil is de-energized and the electromagnetic force disappears.

Figure 6:
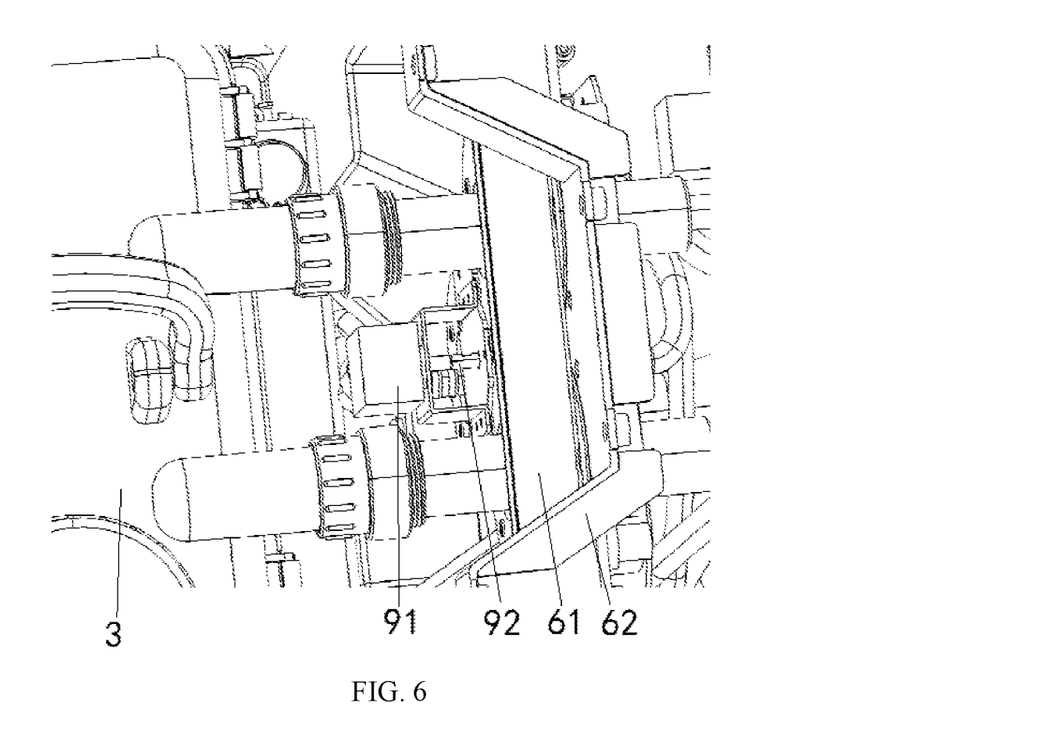
FIG. 6 is a schematic view illustrating the structure of the locking member.

Referring to FIGS. 6 to 7, as a specific implementation of the present disclosure, the connecting side plate 61 is fixed with a locking member 9 for locking the connecting side plate 61 and the positioning and fixing plate 62 to each other. The tightness and firmness of the connection between the pipe joint B and the pipe joint A are further improved by locking with the locking member 9.

Referring to FIG. 7, as a specific implementation of the present disclosure, the positioning and fixing plate 62 is provided with a threaded locking hole, and the locking member 9 includes a locking screw 92 that goes through and is screwed with the locking hole, and a locking motor 91 for driving the locking screw 92 for locking/unscrewing. The locking screw 92 is installed on an output shaft of the locking motor 91. During use, the locking screw 92 is rotated by the locking motor 91 to realize the threaded connection between the locking screw 92 and the locking hole or to loosen the locking screw 92 screwed in the locking hole.

As a specific implementation of the present disclosure, the wastewater bucket 3 includes a bucket body and a bucket cover. A wastewater outlet for discharging wastewater is disposed under the bucket body. A first port 31 for pumping air or injecting cleaning water and a second port 32 for sucking in wastewater or discharging cleaning water are opened in the bucket cover along a horizontal direction. The pipe joint B includes a wastewater drainage joint 615 for connecting with the wastewater outlet, an air pumping and water injection joint 612 for connecting with the first port 31, and a wastewater suction and drainage joint 613 for connecting with the second port 32. The pipe joint B further includes a clean water inlet and outlet joint 614 for introducing or leading clean water into or out of the clean water bucket 4.

When the wastewater bucket 3 and the clean water bucket 4 are connected to the main body unit 2, the first port 31 is used as an air extraction interface, and the second port 32 is connected to the working head, so that the air in the wastewater bucket 3 is extracted through the first port 31 forming a low pressure in the bucket so that the excreta in the working head is sucked into the wastewater bucket 3 through the second port 32. Then the clean water in the clean water bucket 4 is supplied to the working head through the clean water inlet and outlet joint 614, which herein serves as a water outlet. When the wastewater bucket 3 and the clean water bucket 4 are in communication with the water injection and wastewater discharge unit 7, the first port 31 is used to inject flushing water (that is, clean water for washing purposes) into the wastewater bucket 3, so as to clean the wastewater bucket 3, after which the water resulting from cleaning is discharged from the wastewater bucket 3 through the second port 32. The clean water is introduced into the clean water bucket 4 through the inlet and outlet joint of the clean water bucket 4, so that clean water is poured into the clean water bucket 4, where in this case the clean water inlet and outlet joint 614 serves as a water inlet.

As a specific implementation of the present disclosure, the, the positioning and fixing plate 62 includes a first positioning and fixing plate 621 installed on the water injection and wastewater discharge unit 7. The pipe joint A fixed on the first positioning and fixing plate 621 includes a flushing water injection joint 6211 for connecting with the air suction and water injection joint 612, a flushing water outlet joint 6212 for connecting with the wastewater suction and drainage joint 613, and a clean water injection joint 6213 for connecting with the clean water inlet and outlet joint 614. The water injection and wastewater discharge unit 7 includes a water supply pipe 71 for connecting to a water source, where one end of the water supply pipe 71 away from the water source is sequentially connected to a water pump 72 for pumping water and a control valve 73 for controlling the direction of water flow. The control valve 73 is connected to each of the flushing water injection joint 6211 and the clean water injection joint 6213 through a branch pipeline.

Figure 1:
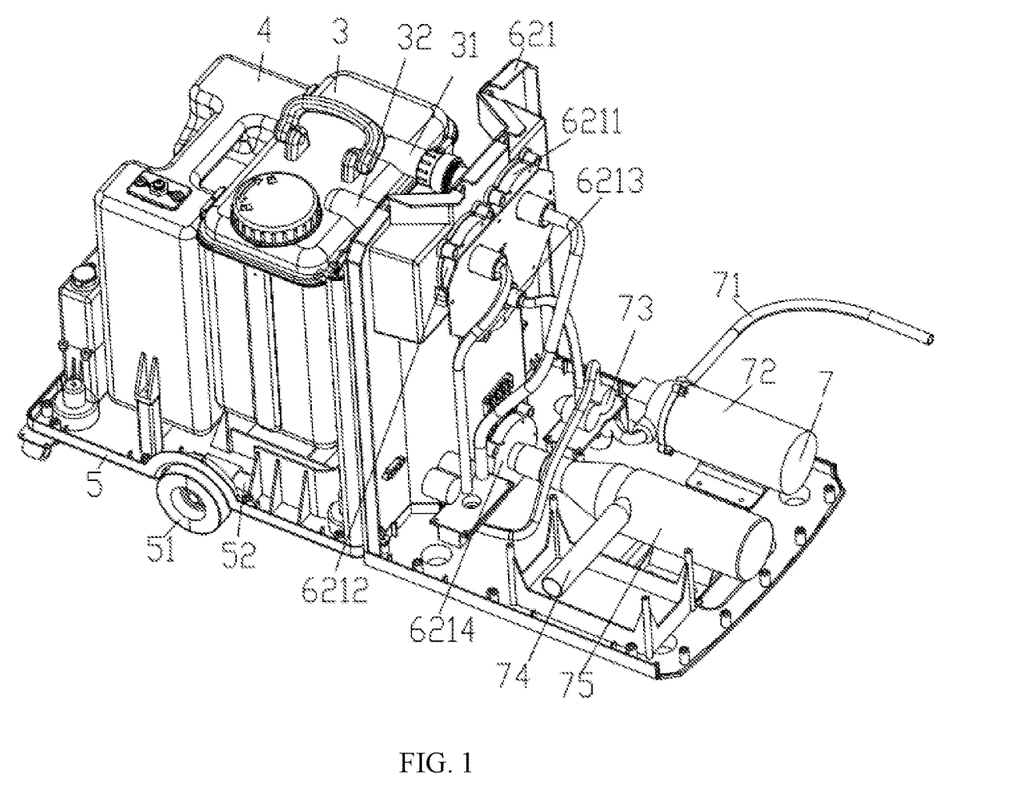
FIG. 1 is a schematic diagram illustrating the structure in which the wastewater bucket and the clean water bucket are communicated with the water injection and wastewater discharge unit.
Figure 3:
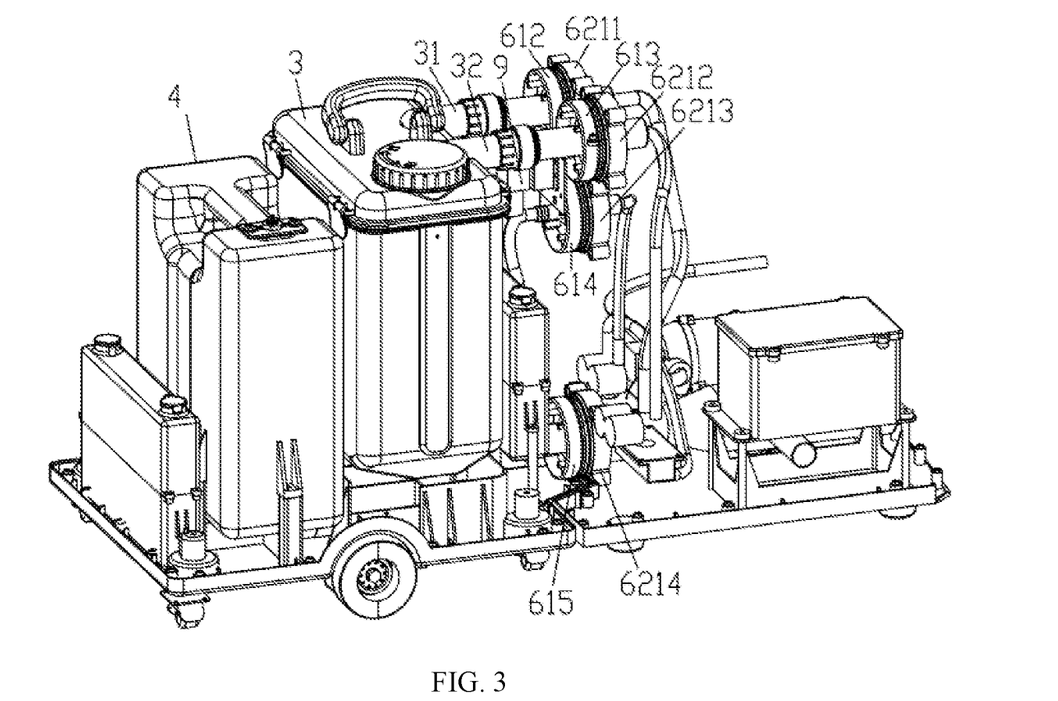
FIG. 3 is another schematic diagram illustrating the structure in which the wastewater bucket and the clean water bucket are communicated with the water injection and wastewater discharge unit.

Referring to FIGS. 1 and 3, when performing wastewater discharge and water injection operations, the wastewater bucket 3 and the clean water bucket 4 are transferred to the side of the water injection and wastewater discharge unit 7 through the mobile base 5. At this time, regarding the wastewater bucket 3, the air suction and water injection joint 612 is connected with the flushing water injection joint 6211, and the wastewater suction and drainage joint 613 is connected with the flushing water output joint 6212. The flushing water (flushing water for cleaning purposes) is delivered to the control valve 73 through the water supply pipe 71 under the action of the water pump 72. The control valve 73 controls the flushing water to flow to the flushing water injection joint 6211, so that the flushing water sequentially passes through the branch pipeline, the flushing water injection joint 6211, and the air pumping and water injection joint 612 before entering the wastewater bucket 3, and then the flushing water is discharged to the sewer through the flushing water output joint 6212, so as to realize the cleaning operation of the wastewater bucket 3. Regarding the clean water bucket 4, the clean water injection joint 6213 is connected to the clean water inlet and outlet joint 614. The clean water is delivered to the control valve 73 through the water supply pipe 71 under the action of the water pump 72. The control valve 73 controls the clean water to flow to the clean water injection joint 6213, so that the clean water sequentially passes through the branch pipeline, the clean water injection joint 6213, and the clean water inlet and outlet joint 614, thereby realizing the water injection operation of the clean water bucket 4. Thus, the cleaning of the wastewater bucket 3 and the water filling of the clean water bucket 4 are convenient, without needing manual cleaning or manual water injection, which effectively reduces the labor burden on the nursing staff.

As a specific implementation of the present disclosure, the pipe joint A fixed on the first positioning and fixing plate 621 further includes a wastewater removal joint 6214 for connecting with the wastewater drainage joint 615, and the water injection and wastewater discharge unit 7 further includes a wastewater discharge pipe 74 for connecting to the sewer. The end of the wastewater discharge pipe 74 away from the sewer is connected with a wastewater discharge pump 75 for pumping wastewater from the wastewater bucket 3 to the sewer, and the wastewater discharge pump 75 is connected to the wastewater removal joint 6214. When performing wastewater discharge operations, the wastewater bucket 3 and the wastewater discharge pipe 74 are connected to the wastewater removal joint 6214 through the wastewater drainage joint 615. Under the action of the wastewater discharge pump 75, the wastewater in the wastewater bucket 3 is sent to the sewer through the wastewater drainage joint 615 and the wastewater removal joint 6214 successively, and then the wastewater bucket can be cleaned. Thus, the wastewater does not need to be manually dumped, which is simple and convenient.

Figure 4:
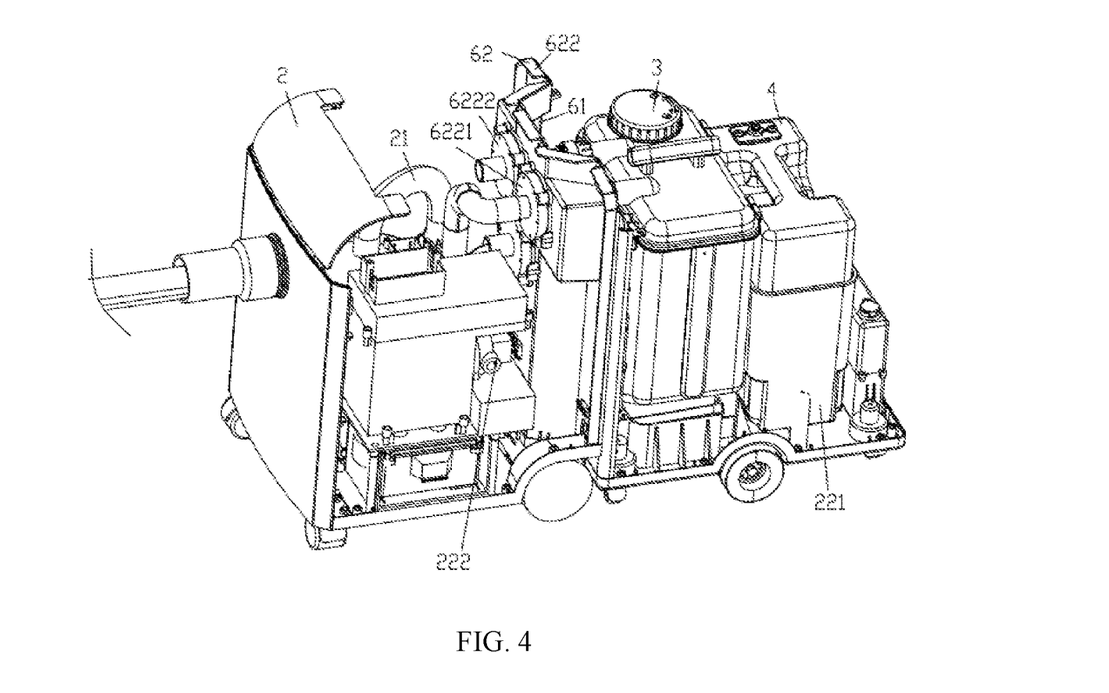
FIG. 4 is a schematic diagram illustrating the structure in which the wastewater bucket and the clean water bucket are communicated with the main body unit.
Figure 5:
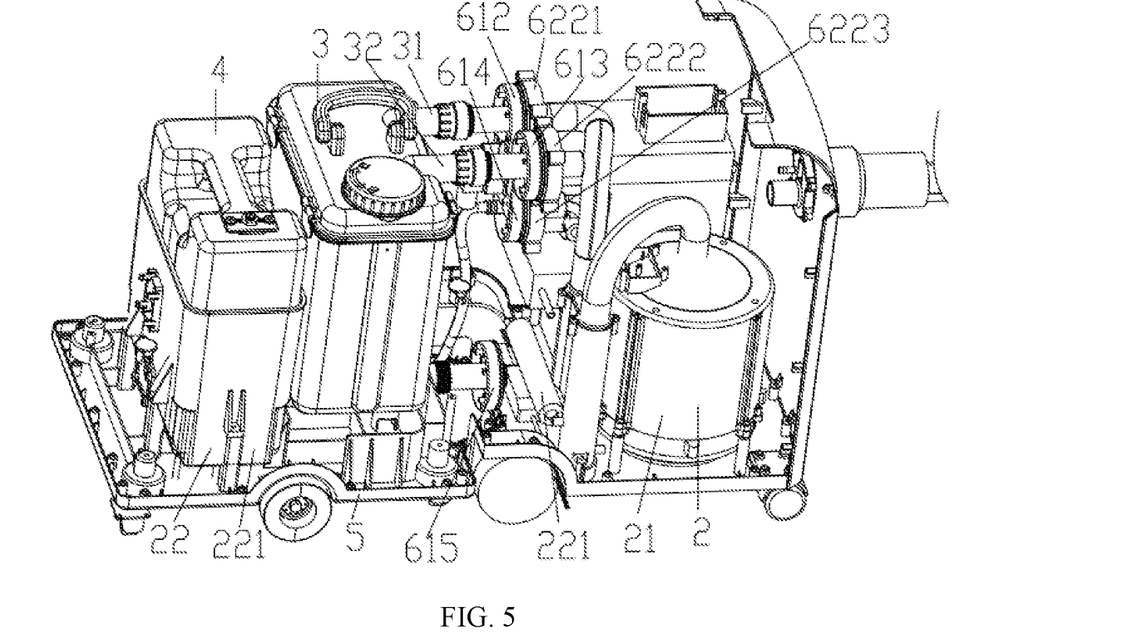
FIG. 5 is another schematic diagram illustrating the structure in which the wastewater bucket and the clean water bucket are communicated with the main body unit.

Referring to FIGS. 4 to 5, as a specific implementation of the present disclosure, the excreta suction mechanism 21 includes a negative pressure source for extracting the air in the wastewater bucket 3. In this embodiment, the negative pressure source is a high-speed fan. The positioning and fixing plate 62 further includes a second positioning and fixing plate 622 installed on the main body unit 2. The pipe joint A fixed on the second positioning fixing plate 622 includes an air suction joint 6221 for connecting the negative pressure source with the air suction and water injection joint 612 and a wastewater injection joint 6222 for connecting with the wastewater suction and drainage joint 613. The end of the wastewater injection joint 6222 away from the wastewater suction and drainage joint 613 is connected with the working head. When carrying out the excreta suction operation, the high-speed fan and the wastewater bucket 3 are connected to each other through the connected air suction port and air suction and water injection joint 612. The cavity in the working head for collecting excreta and the wastewater bucket 3 are connected to each other by the wastewater injection joint 6222 and the wastewater suction and drainage joint 613, which are interconnected. Under the action of the high-speed fan, a low pressure is formed in the wastewater bucket 3, so that the excreta is sucked into the wastewater bucket 3.

As a specific implementation of the present disclosure, the pipe joint A fixed on the second positioning and fixing plate 622 further includes a clean water output joint 6223 for connecting the clean water inlet and outlet joint 614 with the working head. The clean water flushing mechanism 22 includes a clean water pipe for connecting the working head and the clean water output joint 6223. Along the conveying direction of the clean water pipe are sequentially connected a heating and sterilization assembly 221 for heating and sterilizing the clean water output from the clean water bucket 4 and a hot water pump 222 for pumping the heated and sterilized water to the working head. In this embodiment, the heating and sterilization assembly 221 uses a PCT electric heater for heating operation, and an ultraviolet sterilizer for sterilization. When performing a cleaning operation, the clean water bucket and the working head are connected to each other through the connected clean water inlet and outlet joint 614 and clean water output joint 6223. After it is heated and sterilized, the clean water is transported to the working head under the action of the hot water pump 222 for cleaning the patient's private parts or cleaning the internal cavity of the working head carrying waste matter, and then the wastewater resulting from the washing is sucked into the wastewater bucket 3 through the excreta suction mechanism 21.

As a specific implementation of the present disclosure, the mobile base 5 is connected with wheels 51. A moving motor 52 for driving the wheels 51 to rotate is arranged on the side of the wheels 51. In this embodiment, the wheels 51 are sleeved on the output shaft of the moving motor 52. Turning on the moving motor 52, it will drive the wheels 51 to rotate, thereby realizing the movement of the moving base 5.

It should however be noted that although the present disclosure has been described in the specification and illustrated in the drawings in connection with various embodiments, those skilled in the art will understand that the above-described embodiments are merely illustrative embodiments. Some technical features in the embodiments may not be necessary to solve a specific technical problem, so that these technical features may be omitted without necessarily affecting the solution of the technical problems or the formulation of the technical solutions. Furthermore, the features, elements, and/or functions of one embodiment can be combined or cooperated with the features, elements and/or functions of other embodiments as appropriate, unless the combination or cooperation is distinctly not implementable.

What is claimed is:

1. An automated nursing robot, comprising:
    a main body unit, comprising an excreta suction mechanism and a clean water flushing mechanism;
    a wastewater bucket;
    a clean water bucket;
    a water injection and wastewater discharge unit, configured for discharging and flushing the wastewater bucket and adding water to the clean water bucket;
    a mobile base, disposed under the wastewater bucket and the clean water bucket and configured for conveying both the wastewater bucket and the clean water bucket between the main body unit and the water injection and wastewater discharge unit;
    a connecting side plate disposed on one side of the mobile base;
    wherein the main body unit and the water injection and wastewater discharge unit are each equipped with a positioning and fixing plate for connecting with the connecting side plate; wherein each positioning and fixing plate comprises a pipe joint A for connecting with the wastewater bucket or the clean water bucket, and the connecting side plate correspondingly comprises a pipe joint B, and wherein the pipe joint A and the pipe joint B are connected to each other by a magnetic attraction assembly;
    wherein the excreta suction mechanism comprises a negative pressure source for extracting air in the wastewater bucket, the positioning and fixing plate further comprises a second positioning and fixing plate installed on the main body unit, the pipe joint A fixed on the second positioning and fixing plate comprises an air suction joint configured for connecting the negative pressure source with the air suction and water injection joint and a wastewater injection joint configured for connecting with the wastewater suction and drainage joint, and wherein one end of the wastewater injection joint away from the wastewater suction and drainage joint is connected to the working head.

2. The automated nursing robot as recited in claim 1, wherein the magnetic attraction assembly comprises an electromagnetic coil and a magnetic metal sealing disc that operates in cooperation with the electromagnetic coil, wherein the magnetic metal sealing disc is sleeved on either the pipe joint A or pipe joint B, and the electromagnetic coil is sleeved on the other one of the pipe joint A and the pipe joint B.

3. The automated nursing robot as recited in claim 2, wherein the connecting side plate is fixedly installed with a locking member configured for locking the connecting side plate and the positioning and fixing plate to each other.

4. The automated nursing robot as recited in claim 3, wherein the positioning and fixing plate comprises a threaded locking hole, and the locking member comprises a locking screw configured for penetrating and screwing with the locking hole and a locking motor configured for driving the locking screw to lock or unscrew.

5. The automated nursing robot as recited in claim 1, wherein the wastewater bucket comprises a bucket body and a bucket cover, wherein a wastewater outlet is defined at a lower part of the bucket and configured for discharging wastewater, wherein the bucket cover comprises a first port configured for pumping air or injecting flushing water and a second port configured for sucking in wastewater or discharging the flushing water, the first port and the second port being horizontally oriented; wherein the pipe joint B comprises a wastewater drainage joint configured for connecting with the wastewater outlet, an air suction and water injection joint configured for connecting with the first port, and a wastewater suction and drainage joint for connecting with the second port; wherein the pipe joint B further comprises a clean water inlet and outlet joint configured to lead clean water into or out of the clean water bucket.

6. The automated nursing robot as recited in claim 5, wherein the positioning and fixing plate comprises a first positioning and fixing plate installed on the water injection and wastewater discharge unit, wherein the pipe joint A fixed on the first positioning and fixing plate comprises a flushing water injection joint for connecting with the air suction and water injection joint, a flushing water output joint for connecting with the wastewater suction and drainage joint, and a clean water inlet and outlet joint for connecting with the clean water injection joint, wherein the water injection and wastewater discharge unit comprises a water supply pipe for connecting to a water source, wherein an end of the water supply pipe away from the water source is sequentially connected with a pump for pumping water and a control valve for controlling a direction of the water flow, wherein the control valve is connected to the flushing water injection joint and to the clean water injection joint.

7. The automated nursing robot as recited in claim 6, wherein the pipe joint A fixed on the first positioning and fixing plate further comprises a wastewater removal joint for connecting with the wastewater drainage joint, wherein the water injection and wastewater discharge unit further comprises a wastewater discharge pipe for connecting to a sewer, wherein one end of the wastewater discharge pipe away from the sewer is connected with a wastewater discharge pump configured for pumping wastewater from the wastewater bucket to the sewer, wherein the wastewater pump is connected to the wastewater removal joint.

8. The automated nursing robot as recited in claim 1, wherein the pipe joint A fixed on the second positioning and fixing plate further comprises a clean water output joint for connecting the clean water inlet and outlet joint with the working head, the clean water flushing mechanism comprises a clean water pipe for connecting the working head with the clean water output joint, and wherein a heating and sterilization assembly configured for heating and sterilizing the clean water output from the clean water bucket and a hot water pump for pumping the heated and sterilized water to the working head are sequentially connected along a conveying direction of the clean water pipe.

9. The automated nursing robot as recited in claim 1, wherein the movable base is connected with wheels, and a moving motor for driving the wheels to rotate is arranged on a side of the wheels.

\* \* \* \* \*